(12) United States Patent
Huberty et al.

(10) Patent No.: US 11,311,752 B2
(45) Date of Patent: Apr. 26, 2022

(54) FLEXIBLE FILTER ELEMENT HAVING AN END OUTLET

(71) Applicant: 3M INNOVATIVE PROPERTIES COMPANY, St. Paul, MN (US)

(72) Inventors: John S. Huberty, St. Paul, MN (US); Ryan D. Kracht, West St. Paul, MN (US); Michael J. Svendsen, Blaine, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 522 days.

(21) Appl. No.: 15/552,514

(22) PCT Filed: Feb. 18, 2016

(86) PCT No.: PCT/US2016/018373
§ 371 (c)(1),
(2) Date: Aug. 22, 2017

(87) PCT Pub. No.: WO2016/137803
PCT Pub. Date: Sep. 1, 2016

(65) Prior Publication Data
US 2018/0043191 A1    Feb. 15, 2018

Related U.S. Application Data

(60) Provisional application No. 62/121,966, filed on Feb. 27, 2015.

(51) Int. Cl.
*A62B 23/02* (2006.01)
*B01D 46/52* (2006.01)
*A62B 18/02* (2006.01)

(52) U.S. Cl.
CPC ............ *A62B 23/02* (2013.01); *B01D 46/523* (2013.01); *A62B 18/025* (2013.01); *B01D 2265/04* (2013.01)

(58) Field of Classification Search
CPC ........ A62B 23/02; A62B 23/025; A62B 23/06
See application file for complete search history.

(56) References Cited

U.S. PATENT DOCUMENTS

| 2,009,073 A | 7/1935 | Shindel |
| 2,055,853 A | 9/1936 | Schwartz |

(Continued)

FOREIGN PATENT DOCUMENTS

| CA | 1069331 | 1/1980 |
| CA | 2209246 | 7/1996 |

(Continued)

OTHER PUBLICATIONS

Advantage® Flexi-Filter®, [On line] [Retrieved on May 18, 2015], URL <http://us.msasafety.com/Air-Purifying-Respirators-%28APR%29/Filters-%26-Cartridges/Advantage%26reg%3B-Flexi-Filters%26reg%3B/p/000100001000001241>, pp. 1-2.

(Continued)

*Primary Examiner* — Valerie L Woodward
*Assistant Examiner* — Paige Kathleen Bugg
(74) *Attorney, Agent, or Firm* — Steven A. Bern; Dena M. Ehrich

(57) ABSTRACT

The present description provides a filter element that includes an end or side portion attached breather tube. One exemplary filter element described herein includes filter media having front and rear walls each including a proximal end and a distal end, a side portion at the proximal ends of the front and rear walls, and an outlet. The filter element further includes a breather tube attached to the filter media in fluid communication with the outlet. The outlet is positioned at least partially on the side portion, and the front and rear walls of the filter media are joined together at least partially along a perimeter.

18 Claims, 2 Drawing Sheets

(56) References Cited

U.S. PATENT DOCUMENTS

| | | | |
|---|---|---|---|
| 2,206,061 A | 11/1936 | Splaine | |
| 2,142,064 A | 5/1937 | Whipple | |
| 2,205,368 A | 11/1937 | Whipple | |
| 2,220,374 A | 11/1940 | Lewis | |
| 2,320,770 A | 12/1940 | Cover | |
| 2,227,959 A | 1/1941 | Cover | |
| 2,295,119 A | 9/1942 | Malcom | |
| 2,840,184 A | 12/1954 | Stampe | |
| 2,708,932 A | 5/1955 | Pipher | |
| 2,751,904 A | 6/1956 | Lewis | |
| 2,845,927 A | 8/1958 | Hill | |
| 3,316,904 A | 7/1961 | Wall | |
| 3,750,665 A | 8/1973 | Stranicky | |
| 4,299,605 A | 11/1981 | Aiyama | |
| 4,382,440 A | 5/1983 | Kapp | |
| 4,419,110 A | 12/1983 | Ansite | |
| 4,438,057 A | 3/1984 | Sundseth | |
| 4,522,639 A | 6/1985 | Ansite | |
| 4,714,486 A | 12/1987 | Silverthorn | |
| 4,886,058 A | 12/1989 | Brostrom | |
| 4,961,765 A | 10/1990 | Guhne | |
| 4,981,134 A | 1/1991 | Courtney | |
| 5,035,236 A | 7/1991 | Kanegaonkar | |
| 5,074,997 A | 12/1991 | Riley | |
| 5,140,980 A | 8/1992 | Haughey | |
| 5,222,488 A | 6/1993 | Forsgren | |
| 5,240,479 A | 8/1993 | Bachinski | |
| D339,658 S | 9/1993 | Lahteenmaki | |
| 5,636,627 A | 6/1997 | Rochester | |
| 5,647,356 A | 7/1997 | Osendorf | |
| 5,720,789 A | 2/1998 | Pinson | |
| 5,732,695 A | 3/1998 | Metzger | |
| 5,992,414 A | 11/1999 | Tayebi | |
| 6,044,842 A | 4/2000 | Pereira | |
| 6,161,540 A | 12/2000 | Fecteau | |
| 6,279,570 B1 | 8/2001 | Mittelstadt | |
| 6,298,849 B1 | 10/2001 | Scholey | |
| 6,345,620 B2 | 2/2002 | Salapow | |
| 6,408,845 B1 | 6/2002 | Pereira | |
| 6,435,184 B1 | 9/2002 | Ho | |
| 6,467,481 B1 | 10/2002 | Eswarappa | |
| D465,568 S | 11/2002 | Petherbridge | |
| 6,615,838 B1* | 9/2003 | Tsai | A41D 13/11 128/857 |
| 6,761,169 B2 | 7/2004 | Eswarappa | |
| 6,793,702 B2 | 9/2004 | Eswarappa | |
| 7,311,764 B2 | 12/2007 | Friday | |
| 7,334,579 B2 | 2/2008 | Tayebi | |
| 8,021,455 B2 | 9/2011 | Adamek | |
| D652,506 S | 1/2012 | Huberty | |
| D652,910 S | 1/2012 | Duffy | |
| 8,230,860 B2 | 7/2012 | Dankert | |
| 8,388,714 B2 | 3/2013 | Kearsley | |
| 8,460,423 B2 | 6/2013 | Legare | |
| 8,721,402 B2 | 5/2014 | Woo | |
| 8,757,151 B2 | 6/2014 | Johnstone | |
| 8,839,788 B2 | 9/2014 | Betz | |
| 2001/0054424 A1* | 12/2001 | Salapow | A62B 23/02 128/206.17 |
| 2003/0089089 A1* | 5/2003 | Fecteau | A62B 23/02 55/497 |
| 2004/0031489 A1 | 2/2004 | Tayebi | |
| 2004/0055604 A1 | 3/2004 | Viner | |
| 2005/0081497 A1 | 4/2005 | Connor | |
| 2006/0081249 A1 | 4/2006 | Duxbury | |
| 2006/0090754 A1 | 5/2006 | Mittelstadt | |
| 2006/0196157 A1 | 9/2006 | Greer | |
| 2007/0144123 A1* | 6/2007 | Angadjivand | A62B 23/02 55/486 |
| 2007/0144524 A1* | 6/2007 | Martin | A62B 18/025 128/206.12 |
| 2008/0202078 A1* | 8/2008 | Healey | B01D 39/1623 55/341.1 |
| 2008/0289632 A1* | 11/2008 | Dankert | A62B 23/02 128/205.29 |
| 2009/0065006 A1 | 3/2009 | Patterson | |
| 2009/0263546 A1 | 10/2009 | Rea | |
| 2010/0154369 A1 | 6/2010 | Berisha | |
| 2011/0283505 A1 | 11/2011 | Billingsley | |
| 2011/0284006 A1* | 11/2011 | Legare | B01D 39/163 128/205.27 |
| 2013/0139818 A1 | 6/2013 | Billingsley | |
| 2014/0216473 A1 | 8/2014 | Dwyer | |
| 2014/0251327 A1 | 9/2014 | Mittelstadt | |

FOREIGN PATENT DOCUMENTS

| | | |
|---|---|---|
| CA | 2209857 | 7/1996 |
| CA | 2295170 | 11/1999 |
| CA | 2405510 | 10/2001 |
| CA | 2567266 | 5/2007 |
| CN | 201098482 | 8/2008 |
| CN | 201190125 | 2/2009 |
| CN | 101554942 | 10/2009 |
| CN | 201342303 | 11/2009 |
| CN | 101628649 | 1/2010 |
| CN | 101703828 | 5/2010 |
| CN | 201603485 | 10/2010 |
| CN | 202983422 | 6/2013 |
| CN | 203540246 | 4/2014 |
| DE | 2041931 | 3/1972 |
| DE | 3719419 | 12/1988 |
| DE | 10213654 | 9/2003 |
| DE | 10328002 | 1/2005 |
| DE | 202011100327 | 7/2011 |
| DK | 9200731 | 6/1992 |
| EP | 0044721 | 1/1982 |
| EP | 0234277 | 9/1987 |
| EP | 0310970 | 4/1989 |
| EP | 1016599 | 7/2000 |
| EP | 1110610 | 6/2001 |
| EP | 1800729 | 6/2007 |
| FR | 493333 | 8/1919 |
| FR | 814797 | 6/1937 |
| GB | 470850 | 8/1937 |
| JP | 02108844 | 4/1990 |
| JP | 06062349 | 9/1994 |
| JP | 09192246 | 7/1997 |
| JP | 2000-140587 | 5/2000 |
| JP | 2000-288105 | 10/2000 |
| JP | 2002-346326 | 12/2002 |
| KR | 20060121699 | 11/2006 |
| KR | 100900755 | 6/2009 |
| KR | 20090010452 | 10/2009 |
| KR | 100943196 | 2/2010 |
| KR | 100959146 | 5/2010 |
| KR | 100961411 | 6/2010 |
| KR | 100978602 | 8/2010 |
| KR | 20110000792 | 1/2011 |
| KR | 20110037710 | 4/2011 |
| KR | 20110005024 | 5/2011 |
| KR | 101051109 | 7/2011 |
| PL | 172113 | 8/1997 |
| RU | 2008126072 | 1/2010 |
| SE | 8403209 | 6/1984 |
| TW | 262201 | 4/2005 |
| WO | WO 96/36303 | 11/1996 |
| WO | WO 02/13946 | 2/2002 |
| WO | WO 2011/037544 | 3/2011 |
| WO | WO 2013-074337 | 5/2013 |
| WO | WO 2013-090372 | 6/2013 |
| WO | WO 2014-120502 | 8/2014 |

OTHER PUBLICATIONS

International Search Report for PCT International Application No. PCT/US2016/018373, dated Apr. 15, 2016, 2 pages.

(56) References Cited

OTHER PUBLICATIONS

European Application No. 16756081 Supplementary Search Report dated Jun. 20, 2018.

* cited by examiner

FLEXIBLE FILTER ELEMENT HAVING AN END OUTLET

CROSS REFERENCE TO RELATED APPLICATIONS

This application is a national stage filing under 35 U.S.C. 371 of PCT/US2016/018373, filed Feb. 18, 2016, which claims the benefit of U.S. Provisional Application No. 62/121,966, filed Feb. 27, 2015, the disclosure of which is incorporated by reference in its/their entirety herein.

TECHNICAL FIELD

The present description relates to a filter element of a respiratory protection device, and in particular, a flexible filter element including an outlet near an end of the filter element.

BACKGROUND

Respiratory protection devices commonly include a mask body and one or more filter elements attached to the mask body. The mask body is worn on a person's face, over the nose and mouth, and may include portions that cover the head, neck, or other body parts in some cases. Clean air is made available to a wearer after passing through filter media of the filter element. In negative pressure respiratory protection devices, air is drawn through a filter element by a negative pressure generated by a wearer during inhalation. Air from the external environment passes through the filter medium and enters an interior space of the mask body where it may be inhaled by the wearer.

Various techniques have been used to construct and attach filter elements to a respirator. Filter elements are commonly connected to an inlet port of a mask body via a threaded engagement, bayonet engagement, or other engagement, for example. In the case of dual filter element respiratory protection devices, in which two filter elements are provided to filter air for a wearer, the filter elements are often connected to air inlets located proximate each cheek portion of the mask, away from a central portion of the mask, such that the filter elements extend outward at sides of the wearer's head.

SUMMARY

The present description provides a filter element including filter media having front and rear walls each having a proximal end and a distal end, a side portion at the proximal ends of the front and rear walls, and an outlet, and a breather tube attached to the filter media in fluid communication with the outlet. The outlet is positioned at least partially on the side portion, and the front and rear walls of the filter media are joined together at least partially along a perimeter.

The present description further provides a filter element including filter media having front and rear walls each having a proximal end and a distal end, a side portion at the proximal ends of the front and rear walls, and an outlet, and a breather tube attached to the filter media in fluid communication with the outlet. The filter media comprises a single folded filter media portion that forms the front wall and the rear wall, and the front and rear walls are joined at least partially along a perimeter.

The present description further provides a filter element including filter media having front and rear walls each having a proximal end, a distal end and a perimeter, a side portion at the proximal ends of the front and rear walls, and an outlet positioned at least partially on the side portion. The filter element further includes a plenum between the front and rear walls of the filter media, and a breather tube adhesively joined to the filter media in fluid communication with the outlet. The filter media includes a single folded filter media portion joined at least partially along a perimeter and forming the front wall and the rear wall and wherein the filter media is sealed around the outlet.

The above summary of the present invention is not intended to describe each disclosed embodiment or every implementation of the present invention. The Figures and the Detailed Description, which follow, more particularly exemplify illustrative embodiments.

BRIEF DESCRIPTION OF DRAWINGS

The present description will be further explained with reference to the appended Figures, wherein like structure is referred to by like numerals throughout the several views, and wherein.

While the above-identified figures set forth various embodiments of the disclosed subject matter, other embodiments are also contemplated. In all cases, this description presents the disclosed subject matter by way of representation and not limitation. It should be understood that numerous other modifications and embodiments can be devised by those skilled in the art which fall within the scope and spirit of the principles of this description.

DETAILED DESCRIPTION

The present description provides a filter element that may be used with a respiratory protection device to provide breathable air for a user. The filter element includes filter media having front and rear walls and a breather tube attached to the filter media at an end or side portion of the filter media. A filter element as described herein may be easily secured to a respiratory protection device in an ergonomic position.

Figure 1:
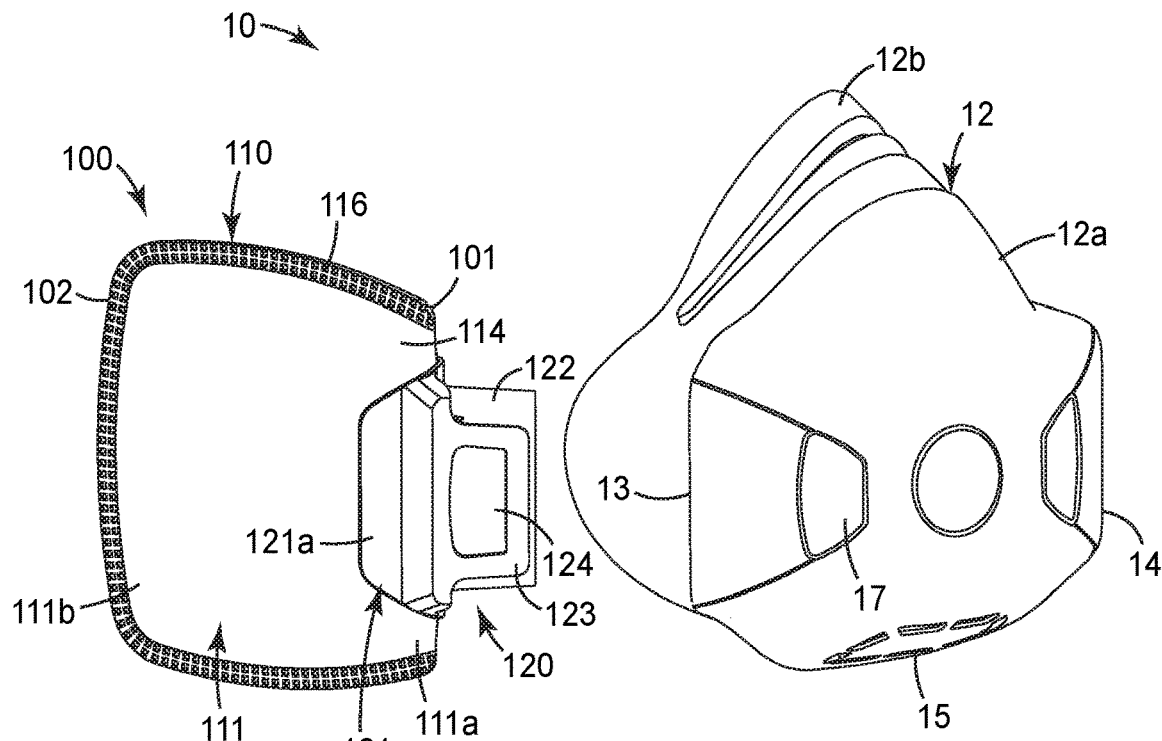
FIG. 1 is a perspective view of an exemplary respiratory protection device including a filter element according to the present description.

FIG. 1 shows an example of a respiratory protection device 10 and filter element 100. Respiratory protection device 10 may be positioned at least partially over a user's nose and/or mouth to provide breathable air to a wearer. Respiratory protection device 10 includes a mask body 12 including first and second inlet ports 13 and 14. First and second (not shown) filter elements 100 may be positioned on opposing sides of mask body 12 and filter air received from the external environment before the air passes into an internal volume within the mask body for delivery to a wearer.

Mask body 12 may include a relatively more rigid or semi-rigid portion 12a and a compliant face contacting portion 12b. Compliant face contacting portion 12b is compliantly fashioned for allowing the mask body to be comfortably supported over a person's nose and mouth and/or for providing an adequate seal with the face of a wearer to limit undesirable ingress of air into an interior of mask body 12, for example. Face contacting member 12b may have an inturned cuff so that the mask can fit comfortably and snugly over the wearer's nose and against the wearer's cheeks. Rigid or semi-rigid portion 12a provides structural integrity to mask body 12 so that it can properly support breathing air source components, such as filter elements 100, for example. In various exemplary embodiments, mask body portions 12a and 12b may be provided integrally or as separately formed portions that are subsequently joined together in permanent or removable fashion.

An exhalation port 15 allows air to be purged from an interior space within the mask body during exhalation by a wearer. In an exemplary embodiment, exhalation port 15 is located centrally on mask body 12. An exhalation valve is fitted at the exhalation port to allow air to exit due to positive pressure created within mask body 12 upon exhalation, but prevent ingress of external air.

A harness or other support (not shown) may be provided to support the mask in position about the nose and mouth of a wearer. In an exemplary embodiment, a harness is provided that includes one or more straps that pass behind a wearer's head. In some embodiments, straps may be attached to a crown member supported on a wearer's head, a suspension for a hard hat, or another head covering.

First and second inlet ports 13, 14 are configured to receive first and second breathing air source components, such as filter elements 100. In an exemplary embodiment shown in FIG. 1, mask body 12 includes first and second inlet ports 13, 14 on either side of mask body 12, proximate cheek portions of mask body 12 for example. First and second inlet ports 13, 14 include complementary mating features (not shown) such that filter elements 100 may be securely attached to mask body 12. Other suitable connections may be provided as known in the art, and in some exemplary embodiments mask body 12 may include only a single inlet port or may include more than two inlet ports, for example. The mating features may result in a removable connection such that filter elements 100 may be removed and replaced at the end of service life of the filter element, or if use of a different breathing air source component is desired. Alternatively, the connection may be permanent such that breathing air source components cannot be removed without damage to the breathing air source component, for example.

In various embodiments, filter element 100 may be used with respiratory protection devices that may include a half face mask, full face mask, single inlets and/or multiple inlets. Similarly, filter element 100 may be used with powered-air respiratory protection devices, or other suitable devices.

Figure 2:
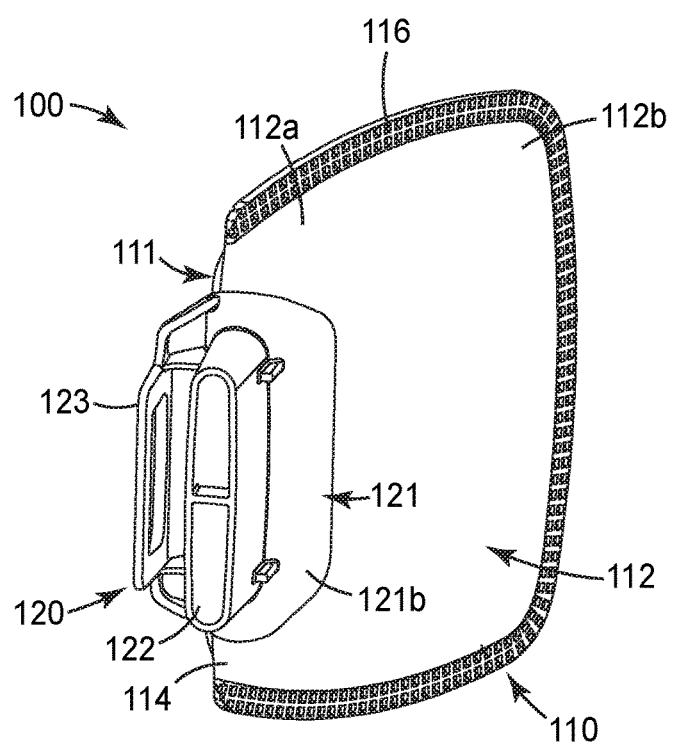
FIG. 2 is a perspective view of an exemplary filter element according to the present description.
Figure 3:
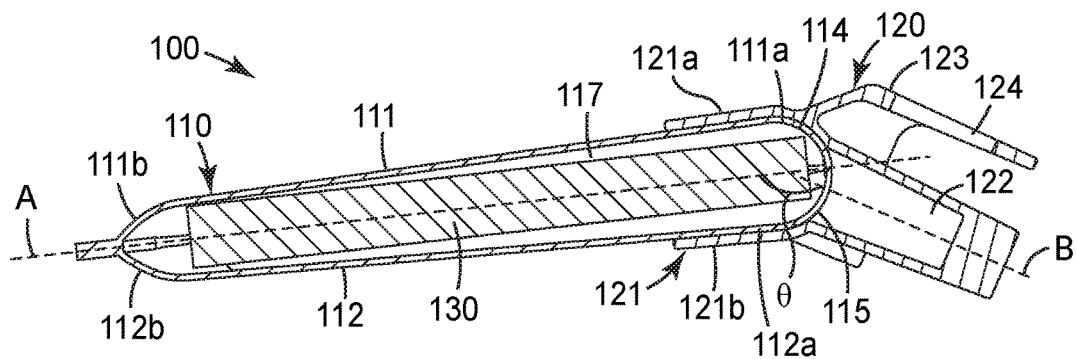
FIG. 3 is a cross-sectional view of an exemplary filter element according to the present description.

FIGS. 1 through 3 show an exemplary filter element 100 including filter media 110 having a front wall 111, a rear wall 112, and an outlet 115 (FIG. 3), and a breather tube 120 attached to filter media 110. Filter element 100 includes first and second ends 101, 102, and breather tube 120 is positioned proximate first end 101. In an exemplary embodiment, front and rear walls 111, 112 of filter media 110 include proximal ends 111a, 112a, and distal ends 111b, 112b. Filter media 110 includes a side-portion 114 at proximal ends 111b, 112b. In various exemplary embodiments, side portion 114 may include a side wall that extends substantially transverse to front and rear walls 111, 112, and/or may be an interface where front and rear walls 111, 112 meet.

Front and rear walls 111, 112 are fluid permeable and function as fluid inlets, such that air may enter an internal volume 117 of filter element 100 after passing through filter media 110. Air may then flow to an outlet 115 (FIG. 3), and exit through breather tube 120 to be delivered to a user.

Front and rear walls 111, 112 include a perimeter 116. Filter media of the front and rear walls 111, 112, are joined along at least a portion of perimeter 116 such that leakage of air cannot occur between front and rear walls 111, 112. Front and rear walls 111, 112 may be joined along at least a portion of perimeter 116, and in some exemplary embodiments along an entire perimeter 116, by a thermomechanical bond, such as ultrasonic welding, sewing, adhesive bonding, other suitable methods known in the art or combinations thereof, such that air leakage between front and rear walls 111, 112, is prevented. In an exemplary embodiment, front wall 111 and rear wall 112 are joined together directly around at least a portion of perimeter 116. In other exemplary embodiments, front wall 111 and rear wall 112 may be joined together indirectly via one or more additional layers, such as a portion of a plenum 130 (FIG. 3), or other suitable layer(s) that allow a secure attachment and prevent leakage. In an exemplary embodiment, a folded, single filter media portion forms front and rear walls 111, 112. Front and rear walls 111, 112 may be joined along a portion of perimeter 116, and side portion 114 includes the location of a fold of filter media 110, as described in further detail herein. In other exemplary embodiments, front and rear walls 111, 112 may be formed from first and second filter media portions that are subsequently joined together.

Outlet 115 allows fluid communication between internal volume 117 of filter element 100 and breather tube 120. In an exemplary embodiment, outlet 115 includes an opening through filter media 110. In other exemplary embodiments, outlet 115 may be a location of filter media 110 in fluid communication with breather tube 120, and/or may include fewer or different layers of material than front and rear walls 111, 112, for example. In the exemplary embodiment shown in FIG. 3, outlet 115 includes an opening at least partially through side portion 114 of filter media 110. That is, outlet 115 is positioned near proximal ends 111a, 112a of front and rear walls 111, 112, and may allow air flow from internal volume 117 through outlet 115 to breather tube 120 in a direction generally parallel to rear wall 112. In some exemplary embodiments, outlet 115 includes an opening that is at least partially through front wall 111, rear wall 112, and/or side portion 114. An outlet positioned near a proximal end of front and rear walls 111, 112, and at first end 101 of filter element 100, provides unique ergonomic, usability, and manufacturability features and advantages, as described further herein.

In various exemplary embodiments, filter element 100 includes a plenum 130 positioned between or contained within front and rear walls 111, 112. Plenum 130 facilitates more even air flow through front and rear walls 111, 112, and provides additional structure that resists compression and assists in maintaining an internal volume 117 between front and rear walls 111, 112.

Plenum 130 may be provided by any suitable component that is resistant to compression when a force is applied and/or acts to return filter element 100 to an original shape after it has been compressed, folded, or otherwise acted on by an external force. In an exemplary embodiment, a nonwoven web of filaments can provide a suitable plenum. One such exemplary plenum is described in U.S. Patent Publication Number 2007/0144123, titled Filter Element that has Plenum Containing Bonded Continuous Filaments. Alternatively, or in addition, other suitable plenums 130 may include a series of ribs, an internal frame, or other suitable features or components to provide additional structure and/or resist compression of filter element 100.

Breather tube 120 may have any suitable shape and configuration such that filtered air may be delivered from filter element 100 to mask body 12. In an exemplary embodiment, breather tube 120 includes one or more attachment flanges 121, a nozzle 122 and a cantilever latch 123. One or more attachment flanges 121 are attached to filter media 110 around a perimeter of outlet 115, and may include any suitable shape that provides a surface for attachment with filter media 110. In an exemplary embodiment, attachment flange 121 includes front and rear flange portions 121a, 121b joined to front and rear walls 111, 112 of filter media 110.

In an exemplary embodiment, breather tube 120 may provide a curved recess formed at least in part by attachment flanges 121 that side portion 114 of filter media 110 may reside in. The curved recess may be shaped and sized to accommodate side portion 114 formed by folding filter media 110, as described further herein. A curved attachment end of breather tube 120 minimizes buckling and creasing, for example, which could otherwise occur when filter media 110 is joined to breather tube 120.

Breather tube 120 may be attached to filter media 110 in any suitable matter that prevents leakage of air into or out of filter element 100. That is, air cannot enter the internal volume 117 without passing through filter media 110, when attached to a mask body 12 properly fitted to a user's face. In various exemplary embodiments, breather tube 120 may be joined to filter media 110 by an ultrasonic weld, adhesive, other suitable techniques, or combinations thereof. In an exemplary embodiment, attachment flanges 121 of breather tube 120 are adhesively joined to filter media 110, for example front wall 111, rear wall 112, and/or side portion 114. To facilitate bonding, and to prevent leakage, breather tube 120 may be adhesively bonded to filter media 110 at least partially at locations where individual layers of filter media 110 are joined, for example by adhesive or ultrasonic welding such that the layers of filter media 110 are bound together to prevent air from entering internal volume 117 without passing through filter media 110. In an exemplary embodiment, attachment flanges 121 of breather tube 120 are joined to outer surfaces of filter media 110. In other exemplary embodiments, one or more attachment flanges 121 may be joined to an inner surface of filter media 110 such that filter media 110 partially covers breather tube 120.

In an exemplary embodiment, attachment flanges 121 provide relatively rigid, external surfaces on opposing sides of filter element 100 that may be gripped by a user when handling filter element 100, such as when attaching or releasing filter element 100 from mask body 12.

Breather tube 120 includes a nozzle 122 extending generally away from filter media 110. Nozzle 122 provides a passage for air to flow from internal volume into mask body 12, and may engage a complementary shaped receiver of mask body 12, for example. In an exemplary embodiment, nozzle 122 has a non-circular shape that prevents rotation when engaged with a receiver of mask body 12, and may extend a relatively large lateral distance into a receiver of mask body 12 to allow a secure attachment. Nozzle 122 may extend outwardly generally linearly, or may curve or otherwise exhibit a non-linear shape. Exemplary breather tube 120 shown in FIGS. 1 through 3 includes a cantilever latch 123 that interacts with features of a receiver of mask body 12 to secure filter element 100 to a mask body 12. In an exemplary embodiment, cantilever latch 123 extends substantially parallel with nozzle 122. Upon insertion, opening 124 of cantilever snaps to or mates with receiver 18 to securely attach filter element 100 to mask body 12. Filter element may be removed by actuating release 17, for example, and removing filter element 100 away from receiver 18. In an exemplary embodiment, breather tube 120 thus provides a sleeve-fit engagement between filter element 100 and mask body 12. One such exemplary engagement is described in U.S. Pat. Pub. No. 2014/0216475, titled Sleeve Fit Respirator Cartridge.

Breather tube 120 may be formed of a suitable material to allow a secure connection with mask body 12, for example, that is relatively more rigid than filter media 110, and that is non-porous to prevent inadvertent leakage. In an exemplary embodiment, breather tube may be formed of a polypropylene. Other suitable materials include suitable polymers, other suitable materials, and combinations thereof, and may be selected to provide desired characteristics for a particular application or to appropriately interact with corresponding features of a mask body or other component of a respiratory protection device. In an exemplary embodiment, breather tube 120 is a single, integrally formed component. In other exemplary embodiments, individual portions of breather tube 120, for example, may be formed separately and subsequently joined or separately attached to filter media 110 to provide desired functionality. In some exemplary embodiments, breather tube 120 and plenum 130 may be integrally formed or joined together.

Filter media 110 may be made of any suitable material to provide desired filtration performance. In an exemplary embodiment, filter media 110 includes a polypropylene blown microfiber web. In various exemplary embodiments, filter material may include a nonwoven web, fibrillated film web, air-laid web, sorbent-particle-loaded fibrous web, glass filter paper, other suitable materials known in the art, and combinations thereof. Filter media 110 may include polyolefins, polycarbonate, polyesters, polyurethanes, glass, cellulose, carbon, alumina, other suitable materials known in the art, and combinations thereof. Filter media 110 may also include charged fibers configured to enhance filtration performance, active particulate, such as activated carbon or alumina, catalysts, or other reactive particulate.

In some exemplary embodiments, front and rear walls 111, 112 of filter media 110 may include or be encompassed by a cover web made from any suitable woven or nonwoven material, such as spunbonded web, thermally bonded webs, or resin-bonded webs. A cover layer may be configured to protect and contain other layers of filter media 110 and may serve as an upstream prefilter layer.

In an exemplary embodiment, filter media 110 is made of a non-rigid or flexible material. Accordingly, front and rear walls 111, 112 are generally non-rigid and flexible, such that front and rear walls 111, 112 may flex or bend when contacted. In an exemplary embodiment, a perimeter 116 of front and rear walls 111, 112 may be slightly more stiff or rigid as compared to other portions of front and rear walls 111, 112, but remain non-rigid and flexible such that filter media 110 may bend and flex.

Filter media 110 may be cut to any suitable shape to provide a filter element 100 having a desired shape, including triangular, rectangular, trapezoidal, oval, elliptical, or other suitable shape. In an exemplary embodiment, filter element 100 is configured for ergonomic positioning on a mask body. Filter element 100 may be secured to mask body 12, or other respiratory protection component, such that filter element 100 remains close to a user's head without substantially interfering with a user's field of vision, and allowing simultaneous use of other suitable personal protective equipment. In various exemplary embodiments, filter element 100 may be characterized by a first angle (θ). First angle (θ) is an angle formed between a first longitudinal axis A passing through a middle of filter media 110, and a second longitudinal axis B passing through a middle of nozzle 123 of breather tube 120. In various exemplary embodiments, first angle (θ) is between about 180° and 120°, 165° and 135°, or about 150°. Such angles facilitate connection with mask body 12 by a user, and ergonomic positioning of filter element 100 when connected to mask body 12.

Figure 4:
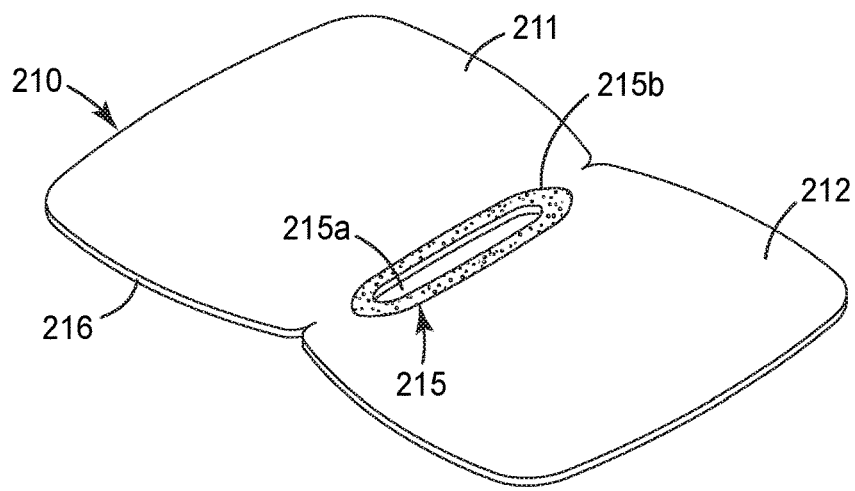
FIG. 4 is a perspective view of exemplary filter media cut for assembly according to the present description.
Figure 5:
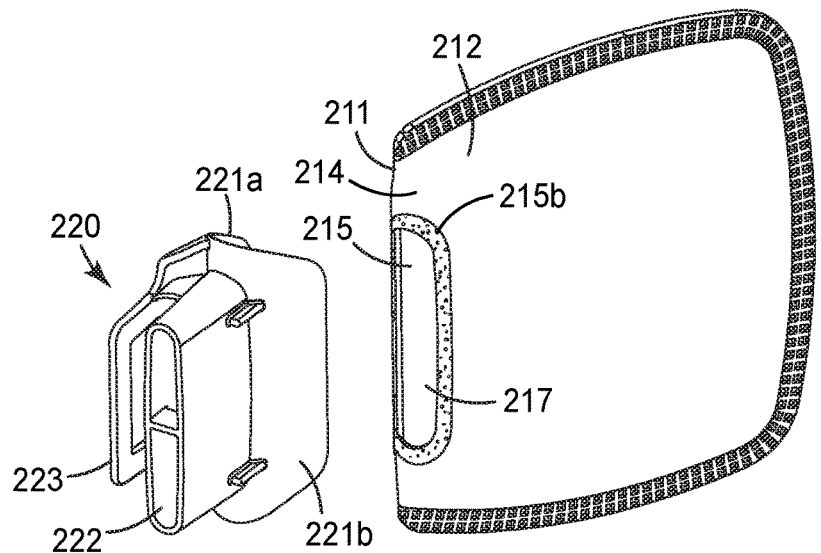
FIG. 5 is an exploded perspective view of an exemplary filter element according to the present description.

FIGS. 4 and 5 illustrate an exemplary method of making a filter element as described herein. One exemplary method of making a filter element according to the present description includes steps of cutting filter media to a desired shape and size, folding the filter media, joining the perimeter of the folded filter media, and attaching a breather tube at an end of the filter media.

Bulk filter media may be cut using any suitable technique known in the art to provide a filter media portion 210 having a desired shape and size. In an exemplary embodiment, bulk filter media is cut into filter media portions 210 including outlet 215 and outer perimeter 216. Outlet 215 comprises an opening 215*a* and a sealed region 215*b* where filter media portion 210 is sealed around opening 215*a*. That is, in an exemplary embodiment, filter media portion 210 includes multiple layers of material. The multiple layers of material are sealed to prevent leakage of air into an internal volume of the filter element without passing through filter media portion 210 as desired. Sealed region 215*b* may be formed using ultrasonic welding, adhesive, other suitable techniques known in the art, or combinations thereof.

Outer perimeter 216 may be shaped to allow filter media portion 210 to be folded proximate the outlet to provide front and rear walls 211, 212 and an outlet 215 positioned proximate a side portion 214 formed by the fold of filter media portion 210. In an exemplary embodiment, a plenum is provided within the filter media portion, and can be positioned before or after filter media portion 210 is folded and/or joined at a perimeter.

Folded filter media portion 210 may be joined along at least a portion of perimeter 216 to securely attach, directly or indirectly, front and rear walls 211, 212, and to define an internal volume 217 between front and rear walls 211, 212, as shown in FIG. 5. In an exemplary embodiment, at least a portion of perimeter 216 of folded filter media portion 210 is joined by discontinuous ultrasonic welding. Other suitable techniques may be used, including other thermomechanical techniques, such as continuous ultrasonic welding, sewing, adhesive bonding, other suitable techniques known in the art, or combinations thereof, such that air leakage between front and rear walls 211, 212, is prevented.

Breather tube 220 is joined to filter media 210 to allow fluid communication with outlet 215. In an exemplary embodiment, engagement flanges 221*a*, 221*b* of breather tube 220 are adhesively joined to filter media 210, for example front wall 211, rear wall 212, and side portion 114. To facilitate bonding, and to prevent leakage, breather tube 220 is adhesively bonded to filter media 210 at least partially at sealed region 215*b*.

A filter element as described herein may be manufactured in any suitable sequence of steps. In an exemplary embodiment, bulk media is prepared by forming a series of outlets 215, including sealed region 215*b*, folded, and joined with a breather tube, such as breather tube 220. A plenum may then be positioned between front and rear walls 211, 212, before joining front and rear walls 211, 212, and subsequently cutting from the bulk filter media to provide a finished filter element. In various other exemplary methods, the above steps may be provided in other sequences or combinations to provide a filter element as described herein.

A filter element as described herein provides several unique features and advantages. Positioning of a breather tube at an end or side portion facilitates easy and secure attachment of the filter element to a mask body or respirator protection device. The filter element may be inserted and snapped into place, for example in a linear direction, without additional rotation or positioning that may be associated with threaded or helical connections. This may be achieved while allowing filter element to reside close to a user's head and minimizing interference with other personal protective equipment when secured to a mask body. Positioning of breather tube at an end or side portion provides additional advantages in maximizing an effective filtering surface area of front and rear walls because the breather tube does not use substantial space on these surfaces of the filter element.

A filter element as described herein provides further manufacturing advantages by allowing a single filter media portion to form front and rear walls of the filter element, in various exemplary embodiments. A breather tube as described herein may also be readily joined to filter media to provide a secure connection, allow easy handling by a user, and may be configured for ergonomic connection with a desired mask body.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures. Any patent literature cited herein is hereby incorporated herein by reference in its entirety to the extent that it does not conflict with the description presented herein.

Any feature or characteristic described with respect to any of the above embodiments can be incorporated individually or in combination with any other feature or characteristic, and are presented in the above order and combinations for clarity only. That is, the present disclosure contemplates all possible combinations, sequences, and arrangements of various features of each of the exemplary embodiments and components described herein, and each component may be combined or used in conjunction with any other component as may be desired for a particular application.

What is claimed is:

1. A filter element, comprising:
   filter media having front and rear walls each comprising a proximal end and a distal end, a side portion at the proximal ends of the front and rear walls, and an outlet, wherein the filter media comprises a single folded filter media portion that forms the front wall, the rear wall, and the side portion, and wherein the side portion interfaces between the front and rear walls; and
   a breather tube attached to the filter media in fluid communication with the outlet, wherein the filter media defines an internal volume enclosed by the front and rear walls such that air enters the internal volume through the filter media and exits through the breather tube to be delivered to a user;

wherein the outlet is positioned at least partially on the side portion, and the front and rear walls of the filter media are joined together at least partially along a perimeter such that leakage of air cannot occur between the front and rear walls, wherein the front wall and rear wall are joined directly together around less than the entire perimeter.

2. The filter element of claim 1, wherein the perimeter of the front and rear walls is non-rigid.

3. The filter element of claim 1, wherein the outlet comprises an opening through the side portion.

4. The filter element of claim 1, wherein the outlet comprises an opening through the front wall.

5. The filter element of claim 1, wherein the outlet comprises an opening through the rear wall.

6. The filter element of claim 1, wherein the outlet comprises an opening, and the opening does not pass through the front or rear walls.

7. The filter element of claim 1, wherein the front wall comprises a first filter media portion and the rear wall comprises a second filter media portion, and the first and second filter media portions are at least partially joined together.

8. The filter media of claim 1, wherein the filter media comprises multiple layers, and the outlet comprises a sealed region at which the multiple layers are sealed together.

9. The filter element of claim 1, wherein the breather tube is joined to outer surfaces of the front wall and the rear wall of the filter media.

10. The filter element of claim 1, wherein the breather tube is joined to an inner surface of the filter media.

11. The filter element of claim 1, wherein the breather tube is adhesively joined to the filter media.

12. The filter element of claim 1, further comprising a plenum between the front and rear walls of the filter media.

13. The filter element of claim 1, wherein the outlet is configured to allow air flow through the outlet to the breather tube in a direction generally parallel to the rear wall.

14. The filter element of claim 1, wherein the filter media defines a continuous portion forming the front and rear walls prior to joining the front and rear walls of the filter media together at least partially along the perimeter.

15. A filter element, comprising: filter media having front and rear walls each comprising a proximal end and a distal end, a side portion at the proximal ends of the front and rear walls, and an outlet; and a breather tube attached to the filter media in fluid communication with the outlet, wherein the filter media defines an internal volume enclosed by the front and rear walls such that air enters the internal volume through the filter media and exits through the breather tube to be delivered to a user; wherein the filter media comprises a single folded filter media portion that forms the front wall, the rear wall, and the side portion, the side portion interfaces between the front and rear walls, and wherein the outlet is positioned at least partially on the side portion, and the front and rear walls are joined at least partially along a perimeter such that leakage of air cannot occur between the front and rear walls, wherein the front wall and rear wall are joined directly together around less than the entire perimeter.

16. The filter element of claim 15, wherein the filter media defines a continuous portion forming the front and rear walls prior to joining the front and rear walls of the filter media together at least partially along the perimeter.

17. A filter element, comprising:
filter media having front and rear walls each comprising a proximal end, a distal end and a perimeter, a side portion at the proximal ends of the front and rear walls, and an outlet positioned at least partially on the side portion;
a plenum between the front and rear walls of the filter media; and
a breather tube adhesively joined to the filter media in fluid communication with the outlet wherein the filter media defines an internal volume enclosed by the front and rear walls such that air enters the internal volume through the filter media and exits through the breather tube to be delivered to a user;
wherein the filter media comprises a single folded filter media portion joined at least partially along a perimeter such that leakage of air cannot occur between the front and rear walls and forming the front wall, the rear wall, and the side portion, wherein the filter media is sealed around the outlet, and wherein the side portion interfaces between the front and rear walls, wherein the front wall and rear wall are joined directly together around less than the entire perimeter.

18. The filter element of claim 17, wherein the filter media defines a continuous portion forming the front and rear walls prior to joining the front and rear walls of the filter media together at least partially along the perimeter.

* * * * *